(12) United States Patent
Meyer et al.

(10) Patent No.: US 11,312,040 B2
(45) Date of Patent: Apr. 26, 2022

(54) METHOD OF PRODUCING A BIOPLASTIC GRANULATE BASED ON SUNFLOWER SEED SHELLS/SUNFLOWER SEED HULL MATERIAL ON THE ONE HAND AND A PLASTIC MATERIAL ON THE OTHER HAND

(71) Applicant: SPC Sunflower Plastic Compound GmbH, Garrel (DE)

(72) Inventors: Sebastian Meyer, Herner (DE); Fabian Hummert, Schöppingen (DE); Reinhard Trumme, Dinklage (DE); Stephan Albers, Dinklage (DE)

(73) Assignee: SPC SUNFLOWER PLASTIC COMPOUND GMBH, Garrel (DE)

( * ) Notice: Subject to any disclaimer, the term of this patent is extended or adjusted under 35 U.S.C. 154(b) by 661 days.

(21) Appl. No.: 16/332,886

(22) PCT Filed: Sep. 13, 2017

(86) PCT No.: PCT/EP2017/073029
§ 371 (c)(1),
(2) Date: Mar. 13, 2019

(87) PCT Pub. No.: WO2018/050698
PCT Pub. Date: Mar. 22, 2018

(65) Prior Publication Data
US 2019/0358854 A1    Nov. 28, 2019

(30) Foreign Application Priority Data
Sep. 13, 2016  (DE) .......................... 102016117168.9

(51) Int. Cl.
B29B 7/46        (2006.01)
B29B 7/84        (2006.01)
(Continued)

(52) U.S. Cl.
CPC ................ *B29B 7/46* (2013.01); *B29B 7/845* (2013.01); *B29B 7/90* (2013.01); *B29B 9/065* (2013.01); *B29C 48/402* (2019.02); *B29C 48/92* (2019.02)

(58) Field of Classification Search
CPC .. B29B 7/46; B29B 7/845; B29B 7/90; B29B 9/065; B29B 7/92; B29B 7/86;
(Continued)

(56) References Cited

U.S. PATENT DOCUMENTS 5,663,221 A * 9/1997 Barcas ..................... B27N 1/00
                                                    264/109
9,507,868 B2    11/2016 Zhu et al.
(Continued)

FOREIGN PATENT DOCUMENTS

CA      2854396 A1 *  5/2013  .............. C08L 23/12
CN      2925844          7/2007
(Continued)

OTHER PUBLICATIONS

Written Opinion of the International Searching Authority for Application No. PCT/EP2017/073 029 dated Nov. 21, 2017.
(Continued)

*Primary Examiner* — Charles Cooley
(74) *Attorney, Agent, or Firm* — Haug Partners LLP

(57) ABSTRACT

A method of producing a bioplastic granulate on the basis of sunflower seed shells or sunflower seed hulls. In the method, ground sunflower seed shells/sunflower seed hull material is provided, wherein the particle size is in the region of 3 mm or less, preferably in the region of 0.01 to 1 mm, preferably in the region of 0.1 to 0.3 mm. A plastic material is provided, which is compounded with the sunflower seed shells/sunflower seed hull material, wherein the compounding operation is preferably effected in an extruder, preferably a
(Continued)

double-screw extruder. The compounded material is chopped at the end of the extruder section with a tool with the addition of water, wherein the water is at a temperature of preferably more than 50° C., preferably about 80 to 90° C., to cool down the compound material. During the compounding operation, the compounding material is subjected to atmospheric degassing and/or vacuum degassing.

14 Claims, 2 Drawing Sheets

(51) Int. Cl.
    *B29C 48/92*     (2019.01)
    *B29C 48/40*     (2019.01)
    *B29B 7/90*     (2006.01)
    *B29B 9/06*     (2006.01)

(58) Field of Classification Search
    CPC .. B29B 7/905; B29B 9/14; B29B 9/16; B29C 48/402; B29C 48/92; B29C 48/022; B29C 48/04; B29C 48/05; B29C 48/287; B29C 48/40; B29C 48/767; F26B 5/08; F26B 17/20; F26B 5/14; C08J 3/12; C08J 3/203; B29K 2511/10
    See application file for complete search history.

(56) References Cited

U.S. PATENT DOCUMENTS

| | | | |
|---|---|---|---|
| 10,173,353 B2 * | 1/2019 | Wendeln | B29C 45/0001 |
| 10,858,511 B2 * | 12/2020 | Meyer | B65D 85/8043 |
| 2007/0170611 A1 | 7/2007 | Hudson | |
| 2010/0146820 A1 | 6/2010 | Ramirez | |
| 2018/0001515 A1 * | 1/2018 | Meyer | B29C 45/0005 |
| 2019/0144664 A1 * | 5/2019 | Meyer | C08L 99/00 523/128 |
| 2019/0358854 A1 * | 11/2019 | Meyer | B29B 9/16 |

FOREIGN PATENT DOCUMENTS

| | | |
|---|---|---|
| CN | 101336152 | 12/2008 |
| CN | 102672933 | 9/2012 |
| CN | 102898852 | 1/2013 |
| CN | 204038431 | 12/2014 |
| CN | 105377964 | 3/2016 |
| CN | 205522424 | 8/2016 |
| CN | 105968826 | 9/2016 |
| DE | 699 10 612 | 3/2004 |
| DE | 10 2012 104 375 | 11/2013 |
| EP | 1 899 125 A1 | 3/2008 |
| EP | 2 565 004 | 3/2013 |
| EP | 2567799 | 12/2013 |
| GB | 2316645 | 3/1998 |
| WO | 2006/001717 A1 * | 1/2006 |
| WO | WO 2013/072146 | 5/2013 |
| WO | WO 2014/184273 | 11/2014 |

OTHER PUBLICATIONS

International Search Report for Application No. PCT/EP2017/073029 dated Nov. 21, 2017.
Japanese Examination Report for Application No. 2019-513917 dated Jul. 27, 2021.
Search report dated Oct. 18, 2020 for corresponding patent application in China with application No. 201780056270.6.
Office Action dated Dec. 27, 2021 for Indian Application No. 201917010834.

* cited by examiner

METHOD OF PRODUCING A BIOPLASTIC GRANULATE BASED ON SUNFLOWER SEED SHELLS/SUNFLOWER SEED HULL MATERIAL ON THE ONE HAND AND A PLASTIC MATERIAL ON THE OTHER HAND

The present application claims priority from International Patent Application No. PCT/EP2017/073029 filed on Sep. 13, 2017, which claims priority from German Patent Application No. DE 10 2016 117 168.9 filed on Sep. 13, 2016, the disclosures of which are incorporated herein by reference in their entirety.

FIELD OF THE INVENTION

It is noted that citation or identification of any document in this application is not an admission that such document is available as prior art to the present invention.

The invention concerns a method of producing a bioplastic granulate based on sunflower seed shells/sunflower seed hull material on the one hand and a plastic material on the other hand.

As state of the art attention is directed to WO 2014/184273 and all state of the art mentioned in that document, in particular WO 2013/072146. As state of the art attention is further directed to documents DE 10 2012 104 375, EP 2 565 004 and DE 699 10 612.

SUMMARY OF THE INVENTION

It has been found that the use of biomaterial granulate in relation to further processing, in particular injection moulding, extrusion and so forth with the technologies known from the state of the art is not possible to the highest level of satisfaction. On the one hand when using granulate known from the state of the art, the injection moulding tools are subject to a high degree of oxidation (rusting) of the tools themselves and on the other hand the plastic products produced in the injection moulding tools can be in part defective or under some circumstances can involve an excessively high level of variation in dimensional accuracy.

The aim of the invention in that respect is to make available the bioplastic granulate to be produced with an extremely low level of residual moisture, wherein the residual moisture is markedly below 1% (percent by weight), preferably even below 0.5% and particularly preferably below 0.1%. A value of for example 0.02 to 0.6%, for example 0.5%, has been found to be optimum.

If it is considered that the sunflower seed shell material used at the outcome has a moisture content which, depending on the kind of sunflower, harvesting conditions, storage conditions and so forth, is in the range of 8 to 10%, it would admittedly be conceivable for the sunflower shell material being used to be already dried down to an extremely low residual moisture content, but the effort involved for that purpose by means of dryers and the energy for the drying operation would be extremely high and therefore not economical.

The invention therefore proposes setting the residual moisture content of the granulate material to the desired target value substantially in three steps during processing of the shell material or compounding, wherein a first significant drying operation is already effected upon grinding of the sunflower shell material. A second drying operation is then effected during the compounding step and a third drying phase is then effected after the compounding step, by the sunflower shell plastic composite which is still very hot being exposed for a predetermined time to a natural air atmosphere or an artificial atmosphere which promotes drying of the material.

During the grinding operation, that is to say during comminution, of the sunflower shell fibres to the desired particle size the sunflower shell material is exposed to a high degree of friction with the consequence that the shell material also correspondingly heats up, for example to temperatures in the region of 30 to 100° C. but temperatures above 100° C. are also possible, in particular when thermal energy is also additionally supplied in the grinding process, from the exterior.

In that way, a first significant drying step is already effected, especially as the air which is moistened by the grinding operation is being continuously sucked away and thus a significant contribution to the moisture in the sunflower shell material is removed. In that drying operation therefore drying is effected without the supply of thermal energy from the exterior. That is admittedly possible, and under some circumstances can also be provided according to the invention, but such a supply of thermal energy from the exterior also entails additional costs for the grinding operation.

It is certainly possible during the grinding drying step for the sunflower shell material to be already reduced from an assumed starting value of 10% moisture to 6 to 4%, which means that the residual moisture content in the shell material after the grinding drying operation is in the region of 4 to 6%, for example 5%.

During compounding of the sunflower shell material with the desired plastic material—the compounding operation preferably takes place in a compounding extruder, for example in a double screw extruder, the sunflower shell material is brought together with the plastic material in the desired ratio, for example 50:50, 40:60, 35:65, 65:35 and so forth, depending on what is desired, and homogenised or mixed—the moisture content is further reduced. Compounding has to be effected at a temperature of >100° C.

Part of the compounding operation is granulation of the material, which means that the compounded material at the end of the compounding operation occurs in the form of balls or a lens shape by a hot pelletizing operation being effected or by the compounded material occurring in the form of a cylinder in the case of cold pelletizing.

In hot pelletizing the extrusion (comprising sunflower seed meal and plastic granulate) is 'chopped up' (pelletized) directly downstream of the nozzle by a rotating blade over which water flows. In that case the rotating blade is under water. In that situation the water prevents the individual granulate bodies, that is to say the balls, lenses or cylinders and so forth from sticking together, and in so doing cools the material to a desired temperature. In most cases water is used for cooling, it is however also alternatively possible to use air or another gas or another liquid (the choice of the correct coolant is inter alia also material-dependent or depends on the respective availability, but also the compatibility of the coolant with the material of the extrusion).

According to the invention it is preferred that the water (that is to say the coolant) in the pelletization operation is of a temperature of more than 50° C., a temperature of about 80-90° C. (±5° C.) is particularly suitable.

As the composite during compounding in the extruder is at a temperature of about 180 to 220° C. and is thus virtually liquid, a first cooling operation is already effected during pelletizing under water in spite of the relatively high water temperature, in which case the granulate material (compound) itself still does not cool down to a temperature of below 100° C., but is kept at a temperature markedly higher than that, for example about 130 to 150° C.

The consequence of this is that, after the compounding operation, further residual moisture which is still present in the shell material and thus in the compound material, can escape from the bioplastic.

That is possible because, under some circumstances, the pores of the compounded bioplastic granulates are not yet completely closed or because individual fibres project outwardly from the granulate and residual moisture can escape from the fibres by virtue of a capillary action, just as it can happen because residual moisture which is still under the surface of the granulate bodies can pass through the material, which promotes the removal of residual moisture from the granulate bodies.

To support the drying operation a degassing operation is effected prior to water pelletizing in the extruder, and that degassing can be effected either in a single step or also in two or more steps.

An experiment has shown that atmospheric degassing which was first carried out and then in a second step also vacuum degassing once again also markedly reduces the residual moisture content in the shell material so that the compounded granulate material at the outlet at the extruder (upon water pelletizing) has a residual moisture content of about 0.1 to 0.5, preferably about 0.08 to 0.2%.

After the water pelletizing operation the granulate bodies are wetted with water on the outside. Removal of that surface water is effected in a dryer, preferably in a centrifugal dryer, by granulate bodies being fed to a centrifuge at relatively high speed and by the granulate bodies being retained by a screen upstream thereof while the water on the granulate bodies passes outwardly through the screen and is carried away.

The water which is removed is under some circumstances—if necessary—cleaned in order to remove from the water constituent parts of the bioplastic granulate which are to be found therein. The water processed in that way can be re-used in the extruder for water pelletizing so that overall the water consumption for the production of the bioplastic granulates according to the invention can also be minimised.

Finally the compounded material, after leaving the dryer, that is to say for example the centrifugal dryer, is passed to a further drying device, more specifically preferably a spiral lift conveyor which provides that the residence time of the compounded granulate in the atmosphere is set to a desired time before the compounded granulate can then be packaged.

In that respect the system is preferably so adjusted that the compounded granulate passes into the spiral lift conveyor section at a temperature of over 100° C., preferably about 130° C., and upon leaving it the material temperature is still at about 50 to 70° C., wherein the last cooling step in the spiral lift conveyor can also be effected by coolant, for example water, being introduced into the bottom of the spiral lift conveyor in specific and targeted fashion.

At the end of the spiral lift conveyor section the residual moisture content can finally be reached with the desired target value of about 0.05% (or less).

The method according to the invention makes it possible to achieve a residual moisture content of 0.05% or even less in finished-packaged compounded granulate under economically reasonable conditions, in particular with careful husbandry of the energy resources.

That has the advantage that this material goes easy on the processing tools (for example injection moulding moulds) in processing in injection moulding machines, extruders or rotary casting pressing technology, thermoforming processes, deep drawing processes and so forth, and in particular no unwanted oxidation occurs at the processing tools, for example injection moulding moulds and so forth, and finally the quality of the direct product produced from the compounded granulate is also markedly more uniform and therefore of better quality.

It has also been found that in the degassing operation, in particular upon atmospheric and/or vacuum degassing, residual oil constituents which under some circumstances still adhere to the shell material can in part also be liberated from the compounded granulate.

In addition the vacuum degassing operation can provide that other volatile components (for example VOC—volatile organic content) which are still in particular in the sunflower shell material are liberated and carried away, which results in a further improvement in quality for the bioplastic granulate.

The invention is based in particular on the realisation that in the compounding process by pelletizing with hot water at about 80-90° C., the sunflower shell plastic granulate is not cooled down markedly below 100° C., as happened previously, but is deliberately kept at a temperature level of above 100° C., preferably about 130° C.

This has the advantage that the moisture can further escape from the shell material as, as is known, at such a temperature water is above the boiling point and very rapidly evaporates and as at such temperatures the plastic material is not yet completely set it is possible for residual moisture present in that ground shell material and thus in the bioplastic granulate bodies to be able to still further escape from the granulate body, so that it is possible to achieve the desired degree of moisture removal.

If the residual moisture content in the compounded granulate material is to be reduced still further than 0.05% it is possible on the one hand either to set the entry temperature of the granulate in the spiral lift conveyor at a higher level and/or to prolong the residence time in the spiral lift conveyor and/or to feed additional heat into the conveyor section of the spiral lift conveyor so that the material is at a temperature of over 100° C. for still longer than previously. It would also be possible to carry out a still more effective drying operation in the extruder, for example by prolonging the length of the extruder section.

As soon as the compounded plastic granulate is at a temperature of 50° C. or less than scarcely any more residual moisture can leave the material.

Finally the method according to the invention provides for drying to the desired residual moisture content in substantially three steps and the drying step during the compounding phase provides not only for a further drying effect but as already mentioned is also suitable for removing oil constituents (or volatile content) which adhere to the shell material or are incorporated therein.

BRIEF DESCRIPTION OF THE DRAWINGS

The invention is described hereinafter by means of embodiments by way of example illustrated in the Figures.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

Figure 1:
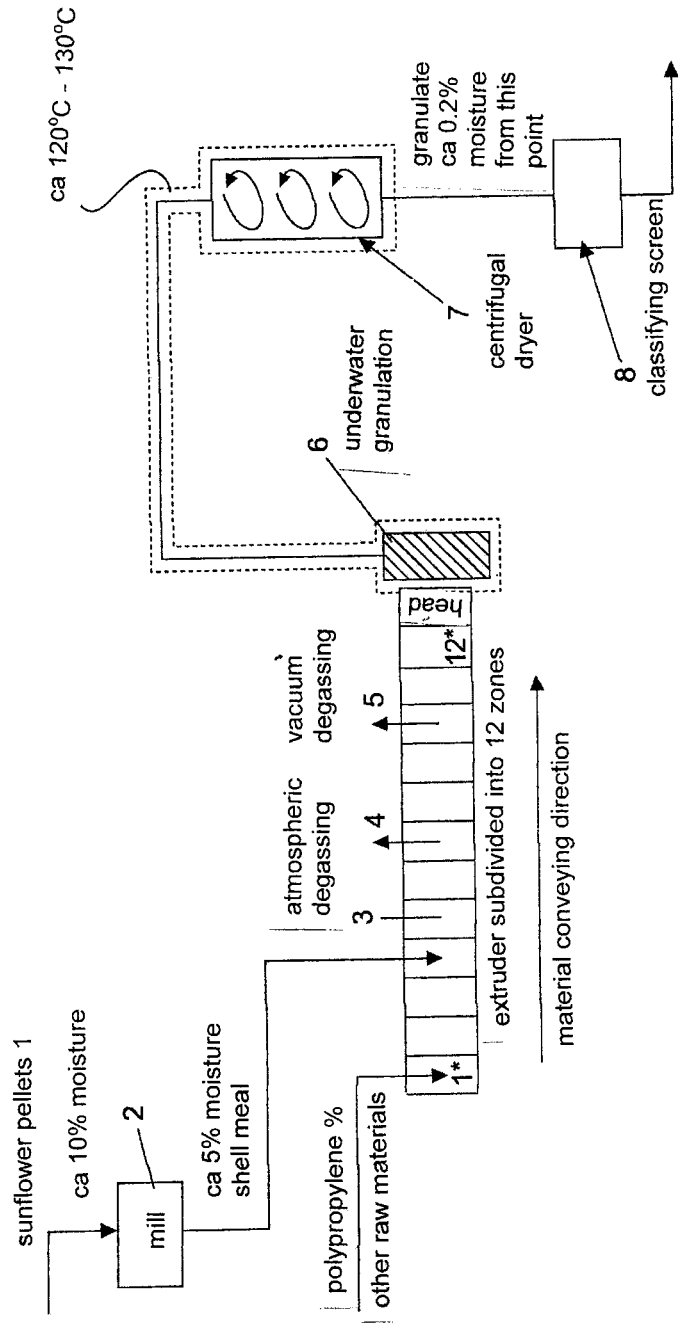
FIG. 1 shows a first overview of the first part of a procedure or a structure for producing a bioplastic granulate according to the invention.

It will be seen from FIG. 1 that firstly sunflower pellets 1 are fed to the system. In that respect sunflower pellets are the shells of shelled sunflower kernels and those shells are pressed/compressed to form pellets.

The moisture proportion contained in the sunflower shells in that case is still at about 10% but, as already mentioned, depending on the kind, harvesting conditions, degree of ripeness, storage conditions and so forth, can fluctuate, more specifically ±2 to 3%. The sunflower pellets are then fed to a mill 2 in which the sunflower shell material is ground to a desired particle size.

During the grinding operation the shell material heats up (for example because of frictional heat) and in that case a large part of the moisture contained in the shells already escapes/evaporates so that the shell meal leaving the mill still has a moisture content of about 5% (±1%).

The shell meal is thereafter passed to an extruder 3 which is subdivided into a plurality of zones, for example twelve zones in the example shown in FIG. 1.

In the first zone a conventional plastic material granulate (or agglomerate) for example polypropylene (PP), of a predetermined particle size and with a predetermined (known) property, is fed to the extruder.

In the extruder 3 which for example is in the form of a double screw extruder the actual compounding operation takes place, in which case the ratio of sunflower shells on the one hand and plastic material on the other hand is adjusted to a desired ratio of for example 50% to 50% or 35% shell material and 65% plastic (variations of 20%-70% shell material and 80-30% plastic material are possible) and thus the compound is homogenised and mixed in a desired ratio.

During the compounding operation the temperature of the compound (that is to say the composite formed from sunflower shell meal and plastic) is about 180 to 220° C. (±10° C.). In that phase the compound is fluid. At those temperatures moisture further escapes from the shell material or compound and dehumidification or drying of the material is promoted in the extruder by for example atmospheric degassing 4 being carried out in one zone of the extruder and vacuum degassing 5 also being carried out if necessary in a further zone.

By virtue of those steps, not only is the shell material further dehumidified but oil and fat constituents of the oil which under some circumstances are still present in the shell material are removed to a considerable extent from the shell material and conveyed out of the extruder by means of a blowing or suction device with exhaust air.

At the end of the extruder the compounding material passes into underwater granulation 6. The water of the underwater granulation operation is in that case at a temperature of preferably more than 50° C., a temperature in the region of about 80 90° C. (±5° C.) is particularly suitable. In the hot pelletizing operation in the underwater granulation step the extrusion of the compound from the extruder is chopped (pelletized) by a rotating blade, that being effected under water. As already mentioned in that situation the water prevents the individual granulate bodies of the compound material, that are formed by the chopping operation, from sticking together, so that the compound material is ultimately present in the form of drops, balls, lenses, cylinders and so forth. At the same time the compound material is cooled down in the underwater granulation operation, but it is still at a temperature at the end of the underwater granulation step of about 130° (±10° C.).

Finally the pelletized compound material is fed to a dryer, as shown in FIG. 1 a centrifugal dryer 7, and the material issuing from the dryer 7 is then a granulate which still has a residual moisture content of about 0.2% (+0.5%). Subsequently the material passes through a classifying screen 8 in which granulates which are too large or too small are removed from the flow of material. The material bodies which are separated off in that way are later recycled to the compounding process and can therefore be re-used.

In the dryer, as shown in FIG. 1 the centrifugal dryer 7, the water clinging to the granulate bodies due to water pelletizing is removed by the granulate material being introduced into a centrifuge in which granulate bodies are separated from the outwardly passing water by means of a screen. If the removed water contains very small constituents of the bioplastic compound granulate material that can also be cleaned if required so that the water overall can be recycled to the circuit for renewed water pelletizing.

It is to be emphasised at this juncture however that the centrifugal dryer 7 essentially involves the purpose of separating the bioplastic granulate from its surface water, that is to say the water which wets the granulate bodies on the outside due to the water pelletizing operation.

At the issue from the centrifugal dryer the bioplastic granulate has an (internal) residual moisture of about 0.2% (±0.1%) and is substantially completely freed from the water supplied by the water pelletizing operation.

Subsequently to the centrifugal dryer 7, as already described above, the bioplastic granulate passes through a classifying screen 8 in which the granulates which are too large or too small are removed from the flow of material. The granulates (material bodies) which are separated off in that way are later recycled to the compounding process and can therefore be re-used. Upon recycling the supplied material then forms fresh granulates, with the newly formed material, and thus is of dimensions corresponding to the dimensions desired for the granulates.

Figure 2:
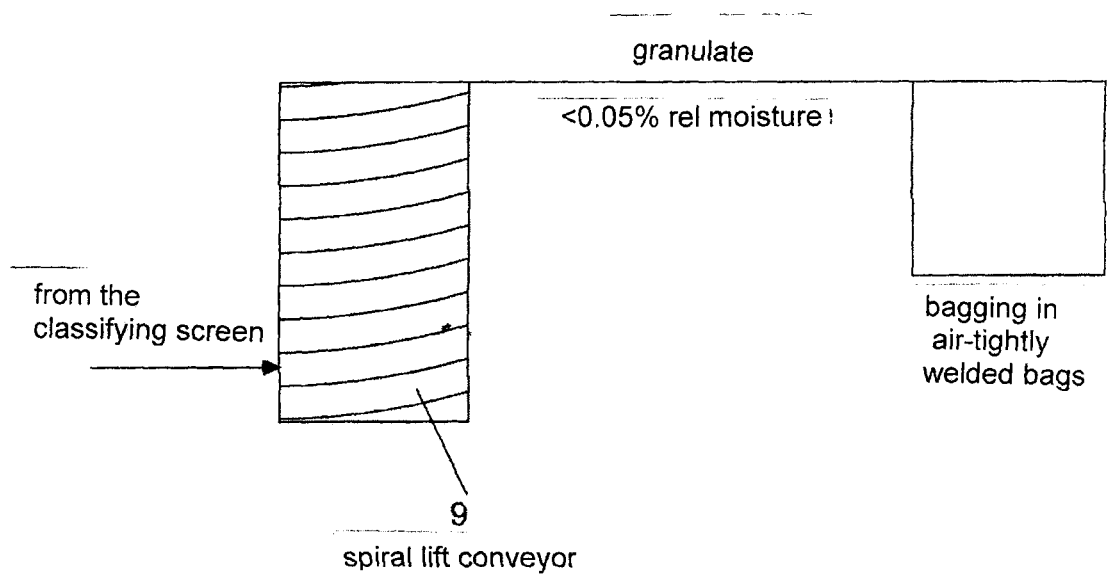
FIG. 2 shows the second part as far as bagging of the bioplastic granulate produced.

Finally downstream of the classifying screen step the granulate material is transferred into a spiral lift conveyor—FIG. 2—in which granulate material which is still hot at over 100° C. is exposed to the atmosphere and therein on the one hand cooling of the material and on the other hand further drying of the granulate is then effected so that finally at the end of the spiral lift conveyor section there is still a residual moisture content of 0.05% relative moisture in the granulate.

At the end of the spiral lift conveyor section the material temperature is still at about 50 to 70° C. and the bioplastic granulate according to the invention produced in that way can then be packaged in air-tightly welded bags. The packaging material, therefore for example the air-tightly welded bags, for the bioplastic according to the invention, is in that respect so designed that it represents a barrier to prevent the ingress of air moisture from the exterior so that even after storage of the bioplastic according to the invention in the bags air moisture cannot diffuse from the exterior into the granulates.

It should be emphasised that the conveyor section between underwater granulation and the centrifugal dryer is as short as possible so that the material is resident there only for a few seconds, for example 5 to 15 seconds, which has the advantage that the material is fed from the underwater granulator to the centrifugal dryer as quickly as possible.

That is particularly important when there are still relevant moisture components contained in the granulate and thus also in the shell material, for, when the temperature there is 120° C., it is also necessary according to the invention to afford the option of carrying out the residual drying operation within a short time, and the water clinging to the outside of the granulates is not to penetrate into the granulate and excessively greatly cool down the granulates.

As already described at least one degassing step is carried out in the extruder, either atmospheric degassing or vacuum degassing. As already described in that case oil or fat constituents which under some circumstances are still present in the shell material are removed from the shell material and thus from the compound which is being formed. That removal is extremely advantageous in terms of the overall quality of the bioplastic granulate which is produced at the end, and in a first experiment it was already possible to provide that substantial oil constituents still present in the shell material could be removed in the extruder from the shell material and thus from the compound by the degassing operation. Substantial signifies at least 5 to 10%, with an increase in the time in the extruder, and in particular in the case of vacuum degassing it was also possible for the proportion of oil removed in the shell material to be increased to 30 to 50% so that as a result the bioplastic granulate produced according to the invention not only has an extremely low moisture content, as mentioned about 0.05%, but also a lower oil/fat content by virtue of the removal of oil/fat in the extruder.

It should be emphasised that the oil and fat proportion in the sunflower shell material depends on many factors, for example also the choice of type of sunflower shell material, degree of crop ripening, and so forth. The method according to the invention ensures that, in spite of different oil and fat constituents at the outcome in the shell material finally a desired quality of the bioplastic material according to the invention is also achieved in regard to its oil and fat content without costly additional measures having to be undertaken for that purpose.

The method according to the invention provides a bioplastic granulate which can be superbly implemented in an injection moulding tool in order to produce therefrom a plastic product of the desired dimensions. In that respect by virtue of the extremely low residual moisture content the injection moulding tools are treated gently and carefully and in particular are scarcely exposed to relevant oxidation.

Finally the plastic product produced is also of first-rate uniform quality which is markedly better than plastic products which were hitherto produced from a bioplastic granulate. In particular the bioplastic granulate according to the invention can be used to manufacture plastic products which are of first-rate quality in regard to typical plastic parameters, in particular in regard to the modulus of elasticity, notch impact strength, surface smoothness and so forth.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

The invention claimed is:

1. A method of producing a bioplastic granulate on the basis of sunflower seed shells or sunflower seed hulls comprising the following steps:
   providing ground sunflower seed shell/hull material having a particle size of 3 mm or less;
   providing a plastic material;
   conducting a compounding operation in which the sunflower seed shell/hull material is compounded with the plastic material in an extruder to create a compounded material; and
   chopping the compounded material at the end of the extruder to create a compound granulate;
   wherein, during the compounding operation, the compounded material is subjected to atmospheric degassing, a vacuum degassing, or both;
   wherein the compound granulate is fed to a cooling and drying device in which a residence time of the compound granulate in the atmosphere is set for a predetermined period and the compound granulate is fed to the drying device at a temperature of more than 100° C. and the plastic granulate leaves the drying device at a temperature below 100° C.;
   wherein a first drying operation is carried out in which the sunflower seed shell/hull material is dried down a first amount prior to the compounding operation;
   wherein a second drying operation is carried out during the compounding operation in which the compounded material is dried down prior to chopping; and
   wherein a third drying operation is carried out in the cooling and drying device in which the compound granulate is dried down so that the produced bioplastic granulate has a residual moisture content of less than 1%.

2. The method according to claim 1;
   wherein a residence time of the compound granulate in the cooling and drying device is about 4 to 8 minutes.

3. The method according to claim 1;
   wherein, before being fed to the cooling and drying device, the compound granulate is fed to an additional drying device that is separate and distinct from the cooling and drying device, wherein the compound granulate leaves the additional drying device at a temperature of about 120-130° C. and with a relative moisture content of about 0.2% (±0.1%).

4. The method according to claim 3;
   wherein the additional drying device is a centrifugal dryer.

5. The method according to claim 1;
   wherein the compound granulate is fed to a classifying screen before it is fed to the cooling and drying device.

6. The method according to claim 1;
   wherein the extruder is subdivided into a plurality of zones.

7. The method according to claim 1;
   wherein the plastic material provided is a polypropylene (PP), polyethylene (PE), acrylonitrile butadiene styrene (ABS), or other known plastic material, which in the feed to the compounding process is in the form of a granulate or agglomerate.

8. The method according to claim 1;
   wherein the extruder is a double screw extruder.

9. The method according to claim 1;
   wherein the compounded material is chopped at the end of the extruder with a tool with the addition of water, wherein the water is at a temperature of more than 50° C.

10. The method according to claim 1;
wherein the cooling and drying device is a spiral lift conveyor.

11. The method according to claim 1;
wherein the sunflower seed shell/hull material is dried down a first amount prior to the compounding operation during grinding in a mill.

12. The method according to claim 1;
wherein the second drying operation is carried out during the atmospheric degassing, the vacuum degassing, or both.

13. The method according to claim 1;
wherein the third drying operation is carried out in the cooling and drying device so that the produced bioplastic granulate has a residual moisture content of less than 0.1%.

14. The method according to claim 1;
wherein the third drying operation is carried out in the cooling and drying device so that the produced bioplastic granulate has a residual moisture content of less than about 0.05%.

\* \* \* \* \*

UNITED STATES PATENT AND TRADEMARK OFFICE
CERTIFICATE OF CORRECTION

PATENT NO. : 11,312,040 B2  
APPLICATION NO. : 16/332886  
DATED : April 26, 2022  
INVENTOR(S) : Sebastian Meyer et al.

Page 1 of 1

It is certified that error appears in the above-identified patent and that said Letters Patent is hereby corrected as shown below:

On the Title Page

Item (72) Under Inventors:
Please correct Inventor Sebastian Meyer's city from: -- Herner -- to "Hemer"

In the Claims

Please move Claim 4 to be Claim 14  
Claim 5 should be numbered as Claim 4  
Claim 6 should be numbered as Claim 5  
Claim 7 should be numbered as Claim 6  
Claim 8 should be numbered as Claim 7  
Claim 9 should be numbered as Claim 8  
Claim 10 should be numbered as Claim 9  
Claim 11 should be numbered as Claim 10  
Claim 12 should be numbered as Claim 11  
Claim 13 should be numbered as Claim 12  
Claim 14 should be numbered as Claim 13

Signed and Sealed this  
Eighteenth Day of July, 2023

Katherine Kelly Vidal  
*Director of the United States Patent and Trademark Office*